Patented Nov. 25, 1969

3,480,711
4-HALOGENO - 1α,2α; 6β,7β - BIMETHYLENE - Δ⁴-3-KETO-STEROIDS AND PROCESS FOR MAKING THE SAME
Rudolf Wiechert, Berlin, Germany, assignor to Schering Aktiengesellschaft, Berlin, Germany
No Drawing. Filed Aug. 2, 1967, Ser. No. 657,749
Claims priority, application Germany, Aug. 25, 1966, Sch 39,449
Int. Cl. A61k *17/06;* C07c *173/00, 169/34*
U.S. Cl. 424—241                                 21 Claims

ABSTRACT OF THE DISCLOSURE 4-halogeno - 1,2α;6,7β - bismethylene-Δ⁴-3-ketosteroids of the general formula

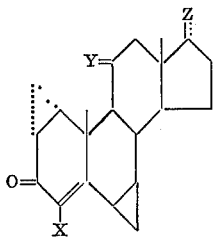

wherein X is halogen with an atomic weight not in excess of 81, Y is hydrogen or oxygen and Z is a member selected from the group consisting of

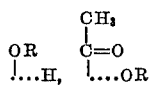

or

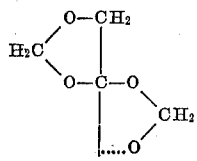

wherein R is hydrogen or acyl. An example of the compounds of the invention is 4-chloro-1,2α;6,7β-bismethylene-Δ⁴-pregnene-17α-ol-3,20-dione-17-acetate.

The compounds have a strong progestational and ovulation inhibiting action with only minor antiandrogenous side effects.

The invention also embraces a process of making 4-halogeno-1,2α;6,7β-bismethylene-Δ⁴-3-ketosteroids of the skeleton formula

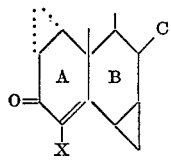

wherein X has the meaning given above which process comprises methylenating the 1,2- and 6,7-double bond of the desired 4-halogeno-Δ¹,⁴,⁶-3-ketosteroids. The compounds of the invention can be made by this process in a convenient manner.

BACKGROUND OF THE INVENTION

It has already been proposed to convert Δ¹,⁴,⁶-3-ketosteroids to the corresponding 1,2-methylene compounds. However the steroids in these cases were unsubstituted in the 4-position and the methylene bridge was formed only at the Δ¹ double bond. Moreover this reaction required a large excess of methylenating reagent (German Patents 1,072,991; 1,096,353; 1,183,500). It was therefore not to be expected that Δ¹,⁶-3-ketosteroids which are substituted at the C-4 carbon atom with halogen, particularly chlorine or bromine, could be subjected to simultaneous methylenation in the 1,2- and 6,7-position.

SUMMARY OF THE INVENTION

The invention accordingly relates to 1,2α;6,7β-bismethylene compositions of the general formula

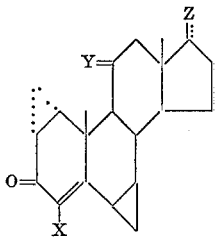

wherein X is halogen with an atomic weight up to 81, Y is hydrogen or oxygen, and Z is a member of the group consisting of

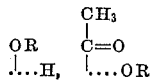

and

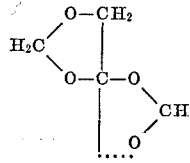

wherein R is hydrogen or acyl.

The invention also embraces a process of making 4-halogeno-1,2α;6,7β-bismethylene-Δ⁴-3-ketosteroids of the skeleton formula

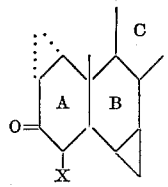

wherein X has the meaning given above which process comprises methylenating the 1,2- and 6,7-double bond of the desired 4-halogeno-Δ¹,⁴,⁶-3-ketosteroids.

DESCRIPTION OF THE PREFERRED EMBODIMENTS

The compounds of the invention may be produced by various methods. The methylene radical can for instance by introduced in a conventional manner by using a reagent such as dimethylmethylene-sulfonium oxide. This reagent can for instance be obtained by reaction of a dimethylsulfoxidemethosalt in an aprotic solvent, such as dimethylsulfoxide or dimethylformamide, with an anhydrous base. The dimethylmethylenesulfoniumoxide is caused to react with the unsaturated ketone without being separated at the temperature between −40 and 100° C., preferably at room temperature.

Another way of effecting the methylenation consists, in an addition reaction between diazomethane and the Δ¹ and Δ⁶ double bond followed by a high temperature or catalytic splitting of the pyrazoline rings. The high temperature splitting is preferably effected at 220 to 250° C.

and conveniently is done in a high vacuum and in the presence of an inert protective gas such as nitrogen.

The catalytic splitting can be carried out by means of acid catalysts such as fluoboric acid, borontrifluoride etherate and, particularly perchloric acid in organic solvents, such as acetone, and preferably at room temperature. The splitting of the ring can also be effected by high boiling-point bases, such as quinoline or aniline.

The steroids used as a starting product may be substituted in the C and D rings, for instance, by halogene, lower alkyl, hydroxyl, lower acyl, alkyloxy and/or acyloxy groups. The term alkyloxy includes groups containing up to 4 carbon atoms and the term acyloxy includes groups containing up to 16 carbon atoms. They may also contain keto groups and/or double bonds but must not have any unsaturated ketone group arrangements.

The 1,2α;6,7β bismethylene steroids of the invention have valuable pharmacological properties and with a suitable carrier, such as cornstarch, lactose, talcum, gelatine, a vegetable oil or a synthetic solvent can therefore form various pharmaceutical preparations. In view of their highly specific reactivity they may also form the starting products for making various hormone materials. The bismethylene derivatives for instance of the hydroxyprogesterone ester have surprisingly strong progestational and ovulation-inhibiting action with only minor antiandrogenous side effects. The following tables show the superior action of the new compounds in a comparison with the novel 4-chloro-1,2α; 6,7β-bismethylene-$\Delta^4$-pregnene-17α-ol-3,20-dione-17-acetate (III) with two prior art progestational compounds, viz 6 - chloro-$\Delta^{4,6}$-pregnadiene-17α-ol-3,20-dione-17-acetate (I) and 17α-ethinyl-$\Delta^4$-estrene-17β-ol-3-one-17-acetate (II).

The progestational action was observed in a conventional Clauberg test. In Table I there is shown the minimum amount (limit value) necessary in each case to obtain a positive action.

TABLE I.—PROGESTATIONAL ACTION IN A RABBIT UTERUS

|  | (a) Subcutaneous application | | (b) Peroral application | |
| --- | --- | --- | --- | --- |
|  | Limit value, mg. | Power, relative | Limit value, mg. | Power, relative |
| Compound: |  |  |  |  |
| I | 0.01 | 1.0 | 0.01–0.03 | 1 |
| II | 0.03 | 0.3 | 0.1 | 0.2 |
| III | 0.003 | 3 | 0.003–0.01 | 3 |

The ovulation inhibiting effect was determined by tubal inspection.

Table II shows that daily dose at which ovulation ceases with 50% of the animals (female rats).

TABLE II

|  | (a) Subcutaneous application | | (b) Peroral application | |
| --- | --- | --- | --- | --- |
|  | WD$_{50}$, mg. | Power, relative | WD$_{50}$, mg. | Power, relative |
| Compound: |  |  |  |  |
| I | 0.5 | 1.0 | 1.0–3.0 | 1.0 |
| II | 0.1–0.3 | 2.5 | 3.0–10.0 | 0.3 |
| III | 0.03–0.1 | 7.7 | 0.1–0.3 | 10.0 |

These tests clearly demonstrate that the new bismethylene composition III is at least three and up to ten times stronger than the prior art progestational compounds I and II.

The following examples illustrate the making of specific compounds of the invention for purposes of illustration only and without any intention of limitation;

Example I 1.77 gram of 4-chloro-$\Delta^{1,4,6}$-androstatriene-17β-ol-3-one were added, under a nitrogen cover, to a solution of 2.92 grams trimethyloxosulfoniumiodide and 690 mg. sodium hydride (as a 50% oil suspension) in 55 ml. dimethylsulfoxide. The mixture, after a reaction time of 30 minutes, was stirred into a weak acetic acid-ice water mixture at room temperature. The precipitate was removed by suction, washed neutral and dried. After recrystallization from isopropylether there were obtained 910 mg. 4-chloro-1,2α;6,7-β-bismethylene-$\Delta^4$-androstene - 17β - ol - 3-one; M.P. 197 to 197.5° C.; UV: $\epsilon_{274}$=12.700.

Example II

An ether solution of diazomethane was prepared from 15 gram nitrosomethylurea, 110 ml. ether and 80 ml. of a 40% potassium hyrdoxide. The diazomethane solution was added to 1.5 mg. of 4-chloro-$\Delta^{1,4,6}$-androstatriene-17β-ol-3-one-17-acetate and left standing in a closed vessel at room temperature for 7 days. The excess solvent was then carefully withdrawn in a vacuum. The bispyrazoline composition that remained as residue was dissolved in 16 ml. acetone and reacted dropwise and upon stirring with 3 ml. of 70% perchloric acid. After the evolution of gas had stopped the mixture was stirred into ten times its amount of ice water. The precipitate was removed by filtration, put into methylenechloride, washed with water and dried over sodium sulfate. The residue, after concentration by evaporation to dryness, was subjected to chromatography on silica gel. There were obtained 350 mg. 4-chloro-1,2α; 6,7β-bismethylene-$\Delta^4$-androstene-17β-ol-3-one-17-acetate; M.P. 181.5 to 182° C. The melting point rose to 191.5 to 193° C. after recrystallization from isopropyl ether; UV: $\epsilon_{272}$=11.800.

Example III 5.5 gram of 4-chloro-$\Delta^{1,4,6}$-pregnatriene-17α-ol-3,20-dione-17-acetate were reacted with an equivalvent amount of an ether solution of diazomethane as described in Example II to form the bispyrazoline compound. After acid opening of the ring and subsequent chromatography and recrystallization from ethyl acetate there were obtained 1.1 g. 4-chloro-1,2α; 6.7β-bismethylene-$\Delta^4$-pregnene-17α-ol-3,20-dione-17-acetate; M.P. 277 to 278° C. (decomposition); UV: $\epsilon_{274}$=12.000.

Example IV 1.2 gram of 4-chloro-$\Delta^{1,4,6}$-pregnatriene-17α-ol-3,20-dione were added to a solution of 2.34 gram of trimethyloxosulfoniumiodide and 470 mg. sodium hydride (as a 50% oil suspension) in 40 ml. dimethylsulfoxide. The mixture was stirred for 90 minutes under nitrogen at room temperature. The reaction product was stirred into a weak acetic acid-ice water solution, whereupon the precipitate was removed by suction, washed and dried. After recrystallization from isopropylether/methylene chloride there were obtained 510 mg. of 4-chloro-1,2α; 6.7β-bismethylene-$\Delta^4$-pregnene-17α-ol-3,20-dione; M.P. 251 to 256° C.; UV: $\epsilon_{274}$=11.800.

Example V 1.4 gram of 4-bromo-$\Delta^{1,4,6}$-pregnatriene-17α-ol-3,20-dione-17-acetate were reacted with an ether solution of diazomethane as described in Example II. The resulting bispyrazoline composition was subjected to acid opening of the ring. The isolated crude 4-bromo-1,2α; 6,7β-bismethylene-$\Delta^4$-pregnene-17α-ol-3,20-dione-17 - acetate was purified by chromatography over silica gel and recrystallization.

Example VI 3 gram of 4-chloro-$\Delta^{1,4,6}$-pregnatriene-17α-ol-3,20-dione-17-capronate were reacted and processed as described in Example II. There were obtained 735 mg. of 4-chloro-1,2α; 6,7β-bismethylene-$\Delta^4$-pregnene-17α-ol-3,20-dione-17-capronate in the form of an oil.

Example VII (a) The following procedure was followed to obtain the starting product: a solution of 565 mg. of chlorine in 10.5 ml. propionic acid was slowly added under stirring in the course of 10 minutes at a temperature of −30° C. to a solution of 3.2 gram of 17,20;20,21-bismethylenedioxy-Δ¹,⁴,⁶-pregnatriene-3,11-dione in 15 ml. dimethylformamide. The reaction mixture was kept for 2 hours at −30° C. and was then poured into ice water. The precipitate was extracted with methylene chloride. The extract was washed in succession with solutions of sodium sulfate, sodium bicarbonate and water and was dried over sodium sulfate. After recrystallization of the crude product from acetic ester there were obtained 1.3 gram of 4-chloro-17,20;20,21-bismethylenedioxy - Δ¹,⁴,⁶ - pregnatriene-3,11-dione; M.P. 247 to 249° C. (decomposition).

(b) This last product in an amount of 1.3 gram was dissolved in 6 ml. methylene chloride and was added, at room temperature, upon stirring and introduction of nitrogen, to a solution of 1.3 gram of trimethyloxosulfonium-iodide and 290 mg. sodium hydride (as a 50% oil suspension) in 17 ml. dimethylsulfoxide. Stirring was continued under the same conditions for another 2 hours. The reaction product which now had assumed a dark color was then added to an ice water-acetic acid solution followed by extraction with methylene chloride, washing of the methylene chloride solution with first a solution of sodium bicarbonate and then water. This was followed by drying over sodium sulfate and concentration by evaporation. The crude product thus obtained was subjected to chromatography over silica gel. By elution with pentane/11% acetone there were obtained 396 mg. of 4-chloro-17,20;20,21-bismethylenedioxy-1,2α; 6,7β-bismethylene-Δ⁴-pregnene-3,11-dione which after recrystallization fom hexane/acetone had a melting point of 276 to 277° C.; UV: $\epsilon_{271}$=9.140.

Without further analysis, the foregoing will so fully reveal the gist of the present invention, that others can by applying current knowledge readily adapt it for various applications without omitting features that from the standpoint of prior art, fairly constitutes essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims.

I claim:
1. 4-halogeno-1,2α;6,7β - bismethylene - Δ⁴ - 3 - ketosteroids of the general formula

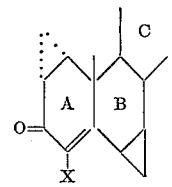

wherein X is halogen having an atomic weight of up to 81, Y is a member selected from the group consisting of hydrogen and oxygen and Z is a member selected from the group consisting of

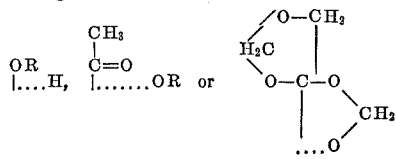

wherein R is a member selected from the group consisting of hydrogen and acyl.

2. The steroid of claim 1 which is 4-chloro-1,2α;6,7β-bismethylene-Δ⁴-androstene-17β-ol-3-one.

3. The steroid of claim 1 which is 4-chloro-1,2α;6,7β-bismethylene-Δ⁴-androstene-17β-ol-3-one-17-acetate.

4. The steroid of claim 1 which is 4-chloro-1,2α;6,7β-bismethylene-Δ⁴-pregnene-17α-ol-3,20-dione-17-acetate.

5. The steroid of claim 1 which is 4-chloro-1,2α;6,7β-bismethylene-Δ⁴-pregnene-17α-ol-3,20-dione.

6. The steroid of claim 1 which is 4-bromo-1,2α;6,7β-bismethylene-Δ⁴-pregnene-17α-ol-3,20-dione-17-acetate.

7. The steroid of claim 1 which is 4-chloro-1,2α;6,7β-bismethylene-Δ⁴-pregnene-17α-ol-3,20-dione-17-capronate.

8. The steroid of claim 1 which is 4-chloro-17,20;20,21-bismethylenedioxy-1,2α;6,7β-bismethylene - Δ⁴ - pregnene-3,11-dione.

9. A progestational and ovulation-inhibiting composition comprising as the essential ingredient a steroid as defined in claim 1 together with a carrier therefor.

10. A method of making 4-halogeno-1,2α;6,7β-bismethylene-Δ⁴-3-ketosteroids compositions of the skeleton formula

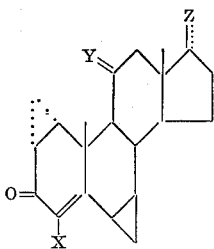

wherein X is halogen having an atomic weight up to 81, comprising methylenating the 1,2 and 6,7 double bond of a 4-halogeno-Δ¹,⁴,⁶-ketosteroid.

11. The process of claim 10 wherein the methylenation is carried out with dimethylmethylenesulfoniumoxide.

12. The process of claim 10 wherein the methylenation is effected by an additional reaction with diazomethane and subsequent splitting of the pyrazoline ring thus formed.

13. The process of claim 12 wherein the splitting of the pyrazoline ring is effected with perchloric acid in acetone.

14. The process of claim 10 wherein the steroid subjected to methylenation has the general formula

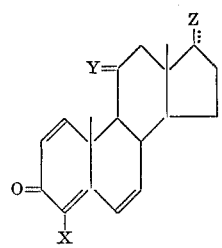

wherein X, Y and Z have the meaning given in claim 1.

15. The process of claim 10 wherein the steroid subjected to methylenation is 4-chloro-Δ¹,⁴,⁶-androstatriene-17β-ol-3-one.

16. The process of claim 10 wherein the steroid subjected to methylenation is 4-chloro-Δ¹,⁴,⁶-androstatriene-17β-ol-3-one-17-acetate.

17. The process of claim 10 wherein the steroid subjected to methylenation is 4-chloro-Δ¹,⁴,⁶-pregnatriene-17α-ol-3,20-dione-17-acetate.

18. The process of claim 10 wherein the steroid subjected to methylenation is 4-chloro-Δ¹,⁴,⁶-pregnatriene-17α-ol-3,20-dione.

19. The process of claim 10 wherein the steroid subjected to methylenation is 4-bromo-Δ¹,⁴,⁶-pregnatriene-17α-ol-3,20-dione-17-acetate.

20. The process of claim 10 wherein the steroid subjected to methylenation is 4-chloro-Δ¹,⁴,⁶-pregnatriene-17α-ol-3,20-dione-17-capronate.

21. The process of claim 10 wherein the steroid subjected to methylenation is 4-chloro-17,20;20,21-bismethylenedioxy-Δ¹,⁴,⁶-pregnatriene-3,11-dione.

References Cited

FOREIGN PATENTS 1,183,500   12/1964   Germany.

ELBERT L. ROBERTS, Primary Examiner

U.S. Cl. X.R.

260—239.5, 239.55, 397.4, 397.45; 424—242